United States Patent
Zhuang et al.

(10) Patent No.: US 9,755,855 B2
(45) Date of Patent: Sep. 5, 2017

(54) VPN IMPLEMENTATION METHOD AND PE DEVICE

(71) Applicant: Huawei Technologies Co., Ltd., Shenzhen (CN)

(72) Inventors: Shunwan Zhuang, Beijing (CN); Zhenbin Li, Beijing (CN); Baohua Song, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 19 days.

(21) Appl. No.: 14/664,392

(22) Filed: Mar. 20, 2015

(65) Prior Publication Data

US 2015/0195105 A1 Jul. 9, 2015

Related U.S. Application Data

(63) Continuation of application No. PCT/CN2013/083435, filed on Sep. 13, 2013.

(30) Foreign Application Priority Data

Sep. 20, 2012 (CN) .......................... 2012 1 0351991

(51) Int. Cl.
*H04L 12/46* (2006.01)
*H04L 12/24* (2006.01)
(Continued)

(52) U.S. Cl.
CPC ...... *H04L 12/4683* (2013.01); *H04L 12/4633* (2013.01); *H04L 12/4641* (2013.01);
(Continued)

(58) Field of Classification Search
CPC . H04L 12/4683; H04L 12/4633; H04L 41/12; H04L 45/50; H04L 12/46; H04L 12/4641
See application file for complete search history.

(56) References Cited

U.S. PATENT DOCUMENTS

2007/0097991 A1* 5/2007 Tatman ............... H04L 12/4641
370/395.53
2007/0280241 A1* 12/2007 Verma ................. H04L 12/4641
370/392
(Continued)

FOREIGN PATENT DOCUMENTS

CN 101047636 A 10/2007
CN 101114971 A 1/2008
(Continued)

OTHER PUBLICATIONS

Rosen et al., BGP/MPLS IP Virtual Private Networks (VPNs), Feb. 2006, Network Working Group, RFC 4364.*
(Continued)

*Primary Examiner* — Mohammad Adhami
*Assistant Examiner* — Shailendra Kumar
(74) *Attorney, Agent, or Firm* — Leydig, Voit & Mayer, Ltd.

(57) ABSTRACT

A VPN implementation method and a PE device are provided. The method includes: sending VPN topology information of a local end to a PE device at a peer end, and receiving VPN topology information of the peer end sent by the PE device at the peer end; enabling, according to the VPN topology information of the local end and the VPN topology information of the peer end, the local end and the peer end to select a jointly supported topology; and connecting VPN members by using the jointly supported topology, so as to implement the VPN. A VPN in a multi-topology environment may be implemented, and service quality of a multi-topology VPN may be improved.

10 Claims, 8 Drawing Sheets

(51) Int. Cl.
*H04L 12/715* (2013.01)
*H04L 12/723* (2013.01)

(52) U.S. Cl.
CPC .............. *H04L 41/12* (2013.01); *H04L 45/04* (2013.01); *H04L 45/50* (2013.01)

(56) References Cited

U.S. PATENT DOCUMENTS

| | | | |
|---|---|---|---|
| 2008/0101360 A1 | 5/2008 | Napieral | |
| 2008/0170578 A1 | 7/2008 | Ould-Brahim | |
| 2008/0267187 A1 | 10/2008 | Kulmala et al. | |
| 2009/0080438 A1 | 3/2009 | Zhou et al. | |
| 2009/0287810 A1 | 11/2009 | Jalava | |
| 2010/0278073 A1* | 11/2010 | Bhavanam | H04L 12/4679 370/254 |
| 2010/0329270 A1* | 12/2010 | Asati | H04L 45/00 370/401 |
| 2011/0110370 A1 | 5/2011 | Moreno et al. | |
| 2012/0314618 A1* | 12/2012 | Ben-Houidi | H04L 12/4641 370/254 |

FOREIGN PATENT DOCUMENTS

| | | |
|---|---|---|
| CN | 101142791 A | 3/2008 |
| CN | 1744541 A | 3/2009 |
| CN | 101834793 A * | 9/2010 |
| CN | 101834793 A | 9/2010 |
| EP | 1684469 A1 | 7/2006 |

OTHER PUBLICATIONS

Sangli et al., BGP Extended Communities Attribute, Feb. 2006, Network Working Group, RFC 4360.*
Rosen et al., "BGP/MPLS IP Virtual Private Networks (VPNs)," Network Working Group, Request for Comments: 4364, pp. 1-47, The Internet Society, Reston, Virginia (Feb. 2006).
Zhao et al., "LDP Extensions for Multi Topology Routing," Internet Engineering Task Force, Internet-Draft, pp. 1-18, The Internet Society, Reston, Virginia (Mar. 11, 2012).
Rekhter et al., "A Border Gateway Protocol 4 (BGP-4)," Network Working Group, Request for Comments: 4271, pp. 1-104, The Internet Society, Reston, Virginia (Jan. 2006).
Psenak et al., "Multi-Topology (MT) Routing in OSPF," Network Working Group, Request for Comments:4915, pp. 1-20, The Internet Society, Reston, Virginia (Jun. 2007).
Bates et al., "Multiprotocol Extensions for BGP-4,," Network Working Group, Request for Comments:4760, pp. 1-12, The Internet Society, Reston, Virginia (Jan. 2007).
Przygienda et al., "M-ISIS: Multi Topology (MT) Routing in Intermediate System to Intermediate Systems (IS-ISs)," Network Working Group, Request for Comments: 5120, pp. 1-14, The Internet Society, Reston, Virginia (Feb. 2008).

* cited by examiner

VPN IMPLEMENTATION METHOD AND PE DEVICE

CROSS-REFERENCE TO RELATED APPLICATIONS

This application is a continuation of International Patent Application No. PCT/CN 2013/083435, filed on Sep. 13, 2013, which claims priority to Chinese Patent Application No. 201210351991.9, filed on Sep. 20, 2012, both of which are hereby incorporated by reference in their entireties.

TECHNICAL FIELD

The present invention relates to communications technologies, and in particular, to a virtual private network (Virtual Private Network, VPN for short) implementation method and a PE device.

BACKGROUND

During implementation of a Multiprotocol Label Switching virtual private network (MultiProtocol Label Switching Virtual Private Network, MPLS VPN for short), VPN members at different locations are connected through an MPLS backbone network, for example, a first VPN member and a second VPN member are connected, where the first VPN member and the second VPN member are connected to a same VPN through an MPLS backbone network. The first VPN member is connected to a first provider edge (Provider Edge, PE for short) device of the MPLS backbone network by using a first customer edge (Customer Edge, CE for short) device, the first PE device is connected to a second PE device through the MPLS backbone network, and the second PE device is connected to the second VPN member by using a second CE. The first VPN member and the second VPN member may perform communication through a path that is formed by the first CE, the first PE, the MPLS backbone network, the second PE, and the second CE.

In the MPLS backbone network, multiple topologies having different quality of service (Quality of Service, QoS for short) may be obtained by means of division. For example, in the MPLS backbone network, a first topology and a second topology having different QoS are obtained by means of division. In the prior art, when different VPN members are connected through the MPLS backbone network, different topologies of the MPLS backbone network may be selected for traffic in different directions. For example, a packet sent by the first VPN member to the second VPN member is transmitted by using the first topology of the MPLS backbone network, and a packet sent by the second VPN member to the first VPN member is transmitted by using the second topology of the MPLS backbone network, which results in inconsistency of quality of service between two communications ends of a same VPN, thereby reducing quality of service of the VPN.

In addition, with continuous development of MPLS VPN technologies, on a VPN member side, a user needs logical topologies that are used for bearing different service flows and obtained by means of division in a VPN, for example, logical topologies used for bearing service flows such as a voice, a video, and data. A VPN can be implemented only when VPN members at different locations select a jointly supported topology during connection. For example, a first VPN member selects a topology 1 used for bearing a voice service flow, a second VPN member needs to select the topology 1 (a same topology ID indicates that a topology bears a same service flow) used for bearing a voice service flow. Only in this way, the first VPN member and the second VPN member can constitute a same VPN. Otherwise, if the first VPN member selects the topology 1 and the second VPN member selects a topology 2 used for bearing a video service flow, the two VPN members cannot constitute a VPN. However, in the prior art, when multi-topology VPN members at different locations are connected in an MPLS VPN, it cannot be ensured that the VPN members select a jointly supported topology, so that an MPLS VPN cannot be implemented when VPN members at two ends of an MPLS backbone network have multiple topologies, and a user requirement cannot be met.

SUMMARY

A VPN implementation method and a PE device are provided, so as to implement an MPLS VPN in a multi-topology environment and improve quality of service of a multi-topology VPN.

According to a first aspect of the application, a VPN implementation method is provided and is applied in a Multiprotocol Label Switching virtual private network MPLS VPN in which multiple topologies exist, where the MPLS VPN includes an MPLS backbone network, and VPN members connected through the MPLS backbone network, the MPLS backbone network includes at least two PE devices, and the at least two PE devices are configured to connect the VPN members to the MPLS VPN; and the method includes:

sending VPN topology information of a local end to a PE device at a peer end, and receiving VPN topology information of the peer end sent by the PE device at the peer end;

enabling, according to the VPN topology information of the local end and the VPN topology information of the peer end, the local end and the peer end to select a jointly supported topology; and connecting the VPN members by using the jointly supported topology, so as to implement the MPLS VPN.

In a possible implementation manner, the multiple topologies exist in the VPN members of the MPLS VPN; the sending VPN topology information of a local end to a PE device at a peer end, and receiving VPN topology information of the peer end sent by the PE device at the peer end includes: sending, to the PE device at the peer end, information of a topology supported by all VPN members connected to the local end as the VPN topology information of the local end; and receiving information of a topology supported by all VPN members connected to the PE device at the peer end sent by the PE device at the peer end; and the connecting the VPN members by using the jointly supported topology includes: sending VPN route information and information of the jointly supported VPN topology to the PE device at the peer end.

In another possible implementation manner, the sending VPN topology information of a local end to a PE device at a peer end, and receiving VPN topology information of the peer end sent by the PE device at the peer end further includes: sending, to the PE device at the peer end, a VPN identifier of a VPN member to which the VPN topology information of the local end belongs, an IP address of a PE device at the local end at which the VPN member is located, and a route target RT, and receiving a VPN identifier of a VPN member to which the VPN topology information belongs, an IP address of the PE device at the peer end, and an RT that are sent by the PE device at the peer end; the enabling, according to the VPN topology information of the local end and the VPN topology information of the peer end, the local end and the peer end to select a jointly supported topology includes: obtaining, according to the received RT sent by the PE device at the peer end, VPN topology information, which matches the RT, of the local end, where a VPN member to which the obtained VPN topology information of the local end belongs is the same as a VPN member at the peer end; and obtaining, according to the VPN topology information of the local end and the VPN topology information of the peer end, information of a VPN topology jointly supported by the VPN members that are the same at the local end and the peer end; and the connecting the VPN members by using the jointly supported topology further includes: further sending the IP address of the PE device at the local end to the PE device at the peer end.

In still another possible implementation manner, the sending VPN topology information of a local end to a PE device at a peer end includes: encapsulating the VPN topology information of the local end in BGP NLRI, and sending it to the PE device at the peer end; and the sending information of the jointly supported VPN topology to the PE device at the peer end includes: encapsulating, in a BGP extended community attribute, the information of the jointly supported VPN topology, and sending it to the PE device at the peer end.

In yet another possible implementation manner, before the sending VPN topology information of a local end to a PE device at a peer end, the method further includes: receiving a BGP Open message sent by the PE device at the peer end, where the BGP Open message carries an identifier used for indicating that the PE device at the peer end supports a VPN topology discovery capability; and performing, according to the identifier, the operation of sending the VPN topology information of the local end to the PE device at the peer end.

In yet another possible implementation manner, the multiple topologies exist in the MPLS backbone network of the MPLS VPN; the sending VPN topology information of a local end to a PE device at a peer end, and receiving VPN topology information of the peer end sent by the PE device at the peer end includes: sending a topology identifier of an MPLS backbone network topology selected by a PE device at the local end to the PE device at the peer end, and receiving a topology identifier, which is sent by the PE device at the peer end, of an MPLS backbone network topology selected by the peer end; the enabling, according to the VPN topology information of the local end and the VPN topology information of the peer end, the local end and the peer end to select a jointly supported topology includes: enabling, according to the topology identifier of the MPLS backbone network topology selected by the local end and the topology identifier of the MPLS backbone network topology selected by the peer end, the local end and the peer end to select an MPLS backbone network topology with a same topology identifier; and the connecting the VPN members by using the jointly supported topology includes: implementing communication between the members by using the MPLS backbone network topology that corresponds to the same topology identifier selected by the local end and the peer end.

In yet another possible implementation manner, the PE device at the local end is a service active party of a VPN service; and the sending a topology identifier of an MPLS backbone network topology selected by the local end to the PE device at the peer end, and receiving a topology identifier, which is sent by the PE device at the peer end, of an MPLS backbone network topology selected by the peer end includes: after performing the step of sending a topology identifier of an MPLS backbone network topology selected by the local end to the PE device at the peer end, receiving the topology identifier, which is sent by the PE device at the peer end, of the MPLS backbone network topology selected by the peer end, where the topology identifier of the MPLS backbone network topology selected by the peer end is the same as the topology identifier of the MPLS backbone network topology selected by the local end.

In yet another possible implementation manner, the PE device at the local end is a service passive party of a VPN service; and the sending a topology identifier of an MPLS backbone network topology selected by the local end to the PE device at the peer end, and receiving a topology identifier, which is sent by the PE device at the peer end, of an MPLS backbone network topology selected by the peer end includes: receiving the topology identifier, which is sent by the PE device at the peer end, of the MPLS backbone network topology selected by the peer end; and if the MPLS backbone network topology corresponding to the topology identifier, which is sent by the PE device at the peer end, of the MPLS backbone network topology selected by the peer end is supported by the local end, sending the topology identifier of the MPLS backbone network topology selected by the local end to the PE device at the peer end, where the topology identifier selected by the local end is the same as the topology identifier selected by the peer end.

In yet another possible implementation manner, the sending a topology identifier of an MPLS backbone network topology selected by the local end to the PE device at the peer end includes: encapsulating, in BGP NLRI, the topology identifier of the MPLS backbone network topology selected by the local end, and sending it to the PE device at the peer end.

In yet another possible implementation manner, before the encapsulating, in BGP NLRI, the topology identifier of the MPLS backbone network topology selected by the local end, and sending it to the PE device at the peer end, the method further includes: receiving a BGP Open message sent by the PE device at the peer end, where the BGP Open message carries an identifier used for indicating that the PE device at the peer end supports a VPN topology selection capability; and performing, according to the identifier, the step of encapsulating, in BGP NLRI, the topology identifier of the MPLS backbone network topology selected by the local end, and sending it to the PE device at the peer end.

In yet another possible implementation manner, before the encapsulating, in BGP NLRI, the topology identifier of the MPLS backbone network topology selected by the local end, and sending it to the PE device at the peer end, the method further includes: encapsulating, in BGP NLRI, an IP address of the local end, VPN identifiers of VPN members connected to the local end, and a route target RT, and send them to the PE device at the peer end; and receiving an IP address of the PE device at the peer end, VPN identifiers of VPN members connected to the PE device at the peer end, and an RT that are sent by the PE device at the peer end by means of BGP NLRI encapsulation; obtaining, according to the received RT sent by the PE device at the peer end, a VPN identifier, which matches the RT, of a VPN member at the local end, where an obtained VPN member at the local end and a VPN member at the peer end belong to a same VPN; and the sending VPN topology information of a local end to a PE device at a peer end includes: encapsulating, in BGP NLRI, the topology identifier of the MPLS backbone network topology selected by the local end, a VPN identifier of a VPN member at the local end that selects the MPLS backbone network topology, the IP address of the local end, a VPN identifier of the VPN member at the peer end that belongs to the same VPN as the VPN member at the local end, and the IP address of the PE device at the peer end, and sending them to the PE device at the peer end.

In yet another possible implementation manner, the sending the topology identifier of the MPLS backbone network topology selected by the local end to the PE device at the peer end includes: encapsulating the topology identifier of the MPLS backbone network topology selected by the local end in an LDP Mapping message or a BGP extended community attribute, and sending it to the PE device at the peer end.

According to another aspect of the application, a PE device is provided and is applied in a Multiprotocol Label Switching virtual private network MPLS VPN in which multiple topologies exist, where the MPLS VPN includes an MPLS backbone network, and VPN members connected through the MPLS backbone network, and at least two of the PE devices each configured to connect the VPN members are located in the MPLS backbone network; and each PE device includes:

an information exchanging unit, configured to send VPN topology information of a local end to a PE device at a peer end, and receive VPN topology information of the peer end sent by the PE device at the peer end;

a topology determining unit, configured to enable, according to the VPN topology information of the local end and the VPN topology information of the peer end, the local end and the peer end to select a jointly supported topology; and a VPN processing unit, configured to connect the VPN members by using the jointly supported topology, so as to implement the MPLS VPN.

In a possible implementation manner, the multiple topologies exist in the VPN members of the MPLS VPN; the information exchanging unit is specifically configured to: send, to the PE device at the peer end, information of a topology supported by all VPN members connected to the local end as the VPN topology information of the local end; and receive information of a topology supported by all VPN members connected to the PE device at the peer end sent by the PE device at the peer end; and the VPN processing unit is specifically configured to send VPN route information and information of the jointly supported VPN topology to the PE device at the peer end.

In another possible implementation manner, the information exchanging unit is further configured to send, to the PE device at the peer end, a VPN identifier of a VPN member to which the VPN topology information of the local end belongs, an IP address of a PE device at the local end at which the VPN member is located, and a route target RT; and receive a VPN identifier of a VPN member to which the VPN topology information belongs, an IP address of the PE device at the peer end, and an RT that are sent by the PE device at the peer end; the topology determining unit is specifically configured to obtain, according to the received RT sent by the PE device at the peer end, VPN topology information, which matches the RT, of the local end, where a VPN member to which the obtained VPN topology information of the local end belongs is the same as a VPN member at the peer end; and obtain, according to the obtained VPN topology information of the local end and the VPN topology information of the peer end, a topology, which corresponds to information of a VPN topology jointly supported by the VPN members that are the same at the local end and the peer end, as a jointly supported topology; and the VPN processing unit is further configured to send the IP address of the PE device at the local end to the PE device at the peer end.

In still another possible implementation manner, the information exchanging unit is specifically configured to encapsulate the VPN topology information of the local end in BGP NLRI, and send it to the PE device at the peer end; and the VPN processing unit is specifically configured to encapsulate, in a BGP extended community attribute, the information of the jointly supported VPN topology, and send it to the PE device at the peer end.

In yet another possible implementation manner, the information exchanging unit is further configured to, before the VPN topology information of the local end is sent to the PE device at the peer end, receive a BGP Open message sent by the PE device at the peer end, where the BGP Open message carries an identifier used for indicating that the PE device at the peer end supports a VPN topology discovery capability.

In yet another possible implementation manner, the multiple topologies exist in the MPLS backbone network of the MPLS VPN; the information exchanging unit is specifically configured to send a topology identifier of an MPLS backbone network topology selected by the local end to the PE device at the peer end, and receive a topology identifier, which is sent by the PE device at the peer end, of an MPLS backbone network topology selected by the peer end; the topology determining unit is specifically configured to enable, according to the topology identifier of the MPLS backbone network topology selected by the local end and the topology identifier of the MPLS backbone network topology selected by the peer end, the local end and the peer end to select a same topology identifier; and the VPN processing unit is specifically configured to implement communication between the members by using the MPLS backbone network topology that corresponds to the same topology identifier selected by the local end and the peer end.

In yet another possible implementation manner, the PE device is a service active party of a VPN service; and the information exchanging unit is specifically configured to, after performing the step of sending a topology identifier of an MPLS backbone network topology selected by the local end to the PE device at the peer end, receive the topology identifier, which is sent by the PE device at the peer end, of the MPLS backbone network topology selected by the peer end.

In yet another possible implementation manner, the PE device is a service passive party of a VPN service; and the information exchanging unit is specifically configured to: receive the topology identifier, which is sent by the PE device at the peer end, of the MPLS backbone network topology selected by the peer end; and if the MPLS backbone network topology corresponding to the topology identifier is supported by the local end, send the topology identifier of the MPLS backbone network topology selected by the local end to the PE device at the peer end, where the topology identifier selected by the local end is the same as the topology identifier selected by the peer end.

In yet another possible implementation manner, the information exchanging unit is specifically configured to encapsulate, in BGP NLRI, the topology identifier of the MPLS backbone network topology selected by a PE device at the local end, and send it to the PE device at the peer end.

In yet another possible implementation manner, the information exchanging unit is further configured to, before encapsulating, in the BGP NLRI, the topology identifier of the MPLS backbone network topology selected by the PE device at the local end, and sending it to the PE device at the peer end, receive a BGP Open message sent by the PE device at the peer end, where the BGP Open message carries an identifier used for indicating that the PE device at the peer end supports a VPN topology selection capability.

In yet another possible implementation manner, the information exchanging unit is further configured to: before encapsulating, in the BGP NLRI, the topology identifier of the MPLS backbone network topology selected by the local end, and sending it to the PE device at the peer end, encapsulate, in BGP NLRI, an IP address of the PE device at the local end, VPN identifiers of VPN members connected to the local end, and a route target RT, and send them to the PE device at the peer end; and receive an IP address of the PE device at the peer end, VPN identifiers of VPN members connected to the PE device at the peer end, and an RT that are sent by the PE device at the peer end by means of BGP NLRI encapsulation; and configured to encapsulate, in BGP NLRI, the topology identifier of the MPLS backbone network topology selected by the local end, a VPN identifier of a VPN member at the local end that selects the MPLS backbone network topology, the IP address of the local end, a VPN identifier of a VPN member at the peer end that belongs to a same VPN as the VPN member at the local end, and the IP address of the PE device at the peer end, and send them to the PE device at the peer end; and the topology determining unit is further configured to obtain, according to the received RT sent by the PE device at the peer end, a VPN identifier, which matches the RT, of a VPN member at the local end, where the VPN member at the local end and the VPN member at the peer end belong to the same VPN.

In yet another possible implementation manner, the information exchanging unit is specifically configured to encapsulate the topology identifier of the MPLS backbone network topology selected by the local end in an LDP Mapping message or a BGP extended community attribute, and send it to the PE device at the peer end.

By using the foregoing technical solutions, VPN topology information is exchanged between a PE device at a local end and a PE device at a peer end, and a jointly supported topology is selected at the local end and the peer end according to the exchanged VPN topology information to implement a VPN, so that a VPN in a multi-topology environment is implemented and quality of service of a multi-topology VPN is improved.

DESCRIPTION OF EMBODIMENTS

Figure 1:
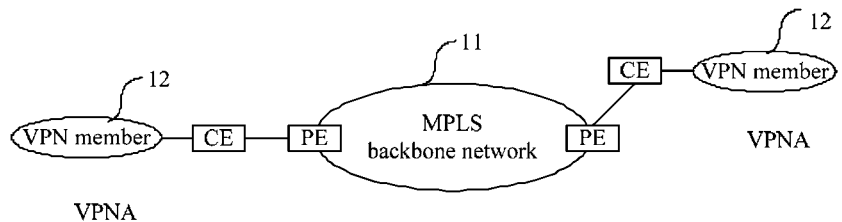
FIG. 1 is an architecture diagram of an application system in an embodiment of a VPN implementation method according to the application.

FIG. 1 is an architecture diagram of an application system in an embodiment of a VPN implementation method according to the application. As shown in FIG. 1, the system is a network architecture of an MPLS VPN, and the MPLS VPN includes an MPLS backbone network 11 and multiple VPN members 12. The VPN members 12 at different locations are connected through the MPLS backbone network 11; moreover, the multiple VPN members 12 may belong to a same VPN. For example, two VPN members 12 exemplified in FIG. 1 are connected through the MPLS backbone network 11 and both belong to a VPNA. At least two PE devices are disposed at edges of the MPLS backbone network 11, where the PE devices are configured to connect VPN members. For example, as shown in FIG. 1, a VPN member 12 at one end of the MPLS backbone network is connected to a PE device by using a CE, and connected to a VPN member 12 at the other end of the MPLS backbone network through connection to the MPLS backbone network by using a PE device. It should be noted that the number of VPN members, the number of PE devices, and the like in an MPLS VPN are not limited to two, and two shown in FIG. 1 is only used as an example.

A VPN implementation method and a specific structure of a PE device are described in detail in the following according to an embodiment of the application on the basis of a network architecture shown in FIG. 1. In the embodiment of the application, multiple topologies exist in the MPLS VPN shown in FIG. 1, where the multiple topologies may exist, for example, in the VPN members 12 or in the MPLS backbone network 11. The embodiment of the application describes an implementation manner of a VPN in a multi-topology environment.

In the following embodiments, concepts of "local end" and "peer end" are involved, which are used to refer to two VPN member sides connected through an MPLS backbone network. For example, a first VPN member and a second VPN member are connected through an MPLS backbone network; then, from the perspective of the first VPN member, an end at which the first VPN member is located is a local end, and an end at which the second VPN member is located is a peer end. Likewise, from the perspective of the second VPN member, the end at which the second VPN member is located is a local end, and the end at which the first VPN member is located is a peer end.

Embodiment 1

Figure 2:
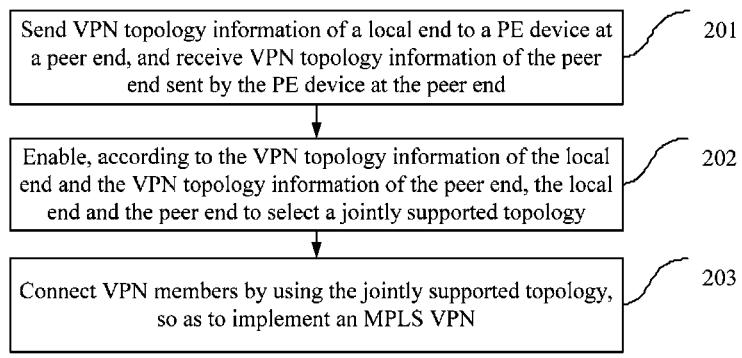
FIG. 2 is a schematic flowchart of an embodiment of a VPN implementation method according to the application.

FIG. 2 is a schematic flowchart of an embodiment of a VPN implementation method according to the application. The VPN implementation method according to this embodiment may be performed by a PE device in an MPLS backbone network. As shown in FIG. 2, the method includes the following steps:

201. Send VPN topology information of a local end to a PE device at a peer end, and receive VPN topology information of the peer end sent by the PE device at the peer end.

In this embodiment, a PE device at the local end exchanges VPN topology information with the PE device at the peer end. That is, the PE device at the local end sends the VPN topology information of the local end to the peer end, and the peer end sends the VPN topology information of the peer end to the local end.

For example, when multiple topologies in an MPLS VPN exist in VPN members, for example, a network structure of the VPN members may be divided into different paths, where the different paths correspond to different topologies, which are used to bear different service flows. For example, the different topologies include two logical topologies used to bear voice and video flows. In this case, the VPN topology information is, for example, topology identifiers (for example, topology IDs) of the two logical topologies.

For another example, when multiple topologies in an MPLS VPN exist in an MPLS backbone network, for example, the MPLS backbone network includes two topologies, in this case, the VPN topology information refers to, for example, topology identifiers (for example, topology IDs) of the two topologies.

When the multiple topologies in the MPLS VPN exist in the VPN members, the VPN topology information is collected by a PE device. For example, a CE may send, to the PE device, topology information existing in a VPN member connected to the CE.

Alternatively, when the multiple topologies in the MPLS VPN exist in the MPLS backbone network, a PE device may select, according to relevant information (for example, a service requirement of a VPN member) of a VPN member connected to the PE device, one topology for the VPN member from the multiple topologies of the MPLS backbone network.

202. Enable, according to the VPN topology information of the local end and the VPN topology information of the peer end, the local end and the peer end to select a jointly supported topology.

In this embodiment, VPN topology information exchange is performed by the PE devices at the local end and the peer end, so that the local end and the peer end may select a jointly supported topology from the multiple topologies according to the exchanged VPN topology information, where the jointly supported topology refers to a topology with a same topology ID. For example, the VPN topology information of both of the two ends includes a topology 1, and the selected jointly supported topology includes the topology 1.

For example, when the multiple topologies in the MPLS VPN exist in the VPN members, the PE device at the local end may enable, according to topology information (for example, a topology 1, a topology 2, and a topology 3 exist) of VPN members at the local end and received topology information (for example, a topology 1 and a topology 4 exist) of VPN members at the peer end, the local end and the peer end to select a jointly supported topology (for example, the topology 1). The local end and the peer end select a jointly supported topology, that is, the jointly supported topology (the topology 1), where one jointly supported topology is selected; and if there are multiple jointly supported topologies, one may be selected from the multiple jointly supported topologies, so as to constitute one VPN.

For another example, when the multiple topologies in the MPLS VPN exist in the MPLS backbone network, that is, different traffic transmission paths are planned for networks in the MPLS backbone network, the different paths correspond to different topologies. Multiple paths may exist in the MPLS backbone network, and therefore, multiple topologies exist. For example, a service flow sent by the PE device at the local end in the MPLS backbone network to the PE device at the peer end may be transmitted through a path 1 or be transmitted through a path 2. In this case, the PE device at the local end may enable, according to topology information (for example, a topology 1) of an MPLS backbone network selected by the local end and topology information (for example, a topology 1) of an MPLS backbone network selected by the PE device at the peer end, the local end and the peer end to select a jointly supported topology from the multiple topologies. As described above, the multiple topologies exist in the MPLS backbone network; when a service flow is transmitted in the MPLS backbone network, the service flow may be transmitted through the topology 1 or be transmitted through the topology 2. A specific topology through which the service flow is transmitted is determined by the PE device. That is, the PE device is responsible for selecting one from the multiple topologies in the MPLS backbone network. For example, the one topology may be determined according to a transmission requirement of the service flow, where transmission paths corresponding to different topologies may have different transmission quality. The PE device at the local end and the PE device at the peer end are a service active party and a service passive party respectively, where a party that selects a topology first is a service active party, and a party that selects a topology latter is a service passive party; the PE device may be configured as a service active party or a service passive party in advance. The service active party selects one topology from the multiple topologies in the MPLS backbone network first, and notifies the service passive party; then, the service passive party may perform same selection as the service active party.

203. Connect VPN members by using the jointly supported topology, so as to implement the MPLS VPN.

In this embodiment, after selecting the jointly supported topology from the multiple topologies, the local end and the peer end implements, based on the jointly supported topology, a VPN.

For example, when the multiple topologies in the MPLS VPN exist in the VPN members, a VPN member at the local end and a VPN member at the peer end that are connected by the MPLS backbone network may implement a VPN by using the jointly supported topology 1; or when the multiple topologies in the MPLS VPN exist in the MPLS backbone network, both a VPN member at the local end and a VPN member at the peer end may communicate by using the topology 1 in the MPLS backbone network.

According to the VPN implementation method in this embodiment, in an MPLS VPN in a multi-topology environment, VPN topology information is exchanged between a PE device at a local end and a PE device at a peer end, and a jointly supported topology is selected at the local end and the peer end according to the exchanged VPN topology information to implement a VPN in the multi-topology environment, so that quality of service of the multi-topology VPN is ensured. For example, when multiple topologies exist in an MPLS backbone network, a local end and a peer end select a same MPLS backbone network topology, which can ensure consistency of quality of service at the two ends during communication.

Embodiment 2

Figure 3:
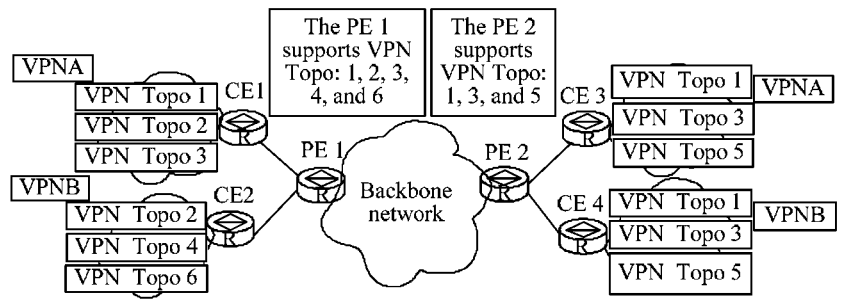
FIG. 3 is a schematic diagram of a system architecture in another embodiment of a VPN implementation method according to the application.
Figure 4:
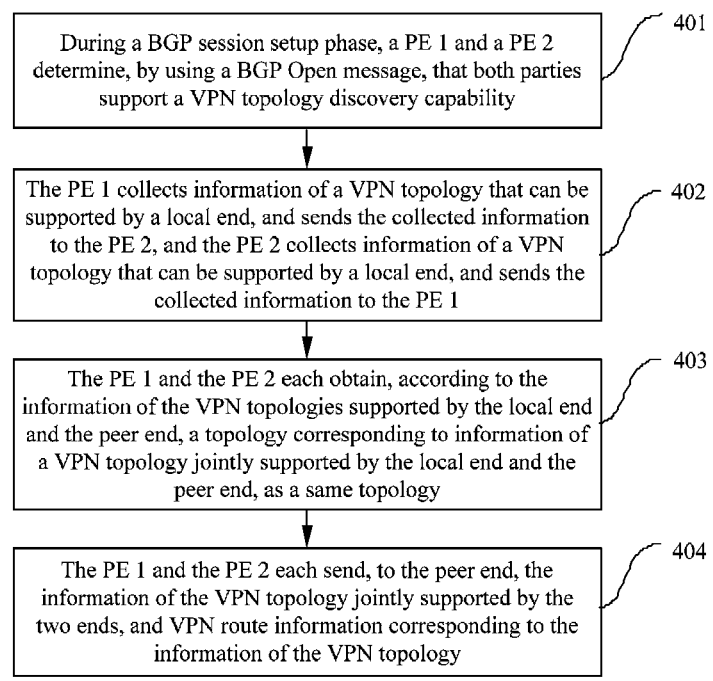
FIG. 4 is a schematic flowchart of another embodiment of a VPN implementation method according to the application.

FIG. 3 is a schematic diagram of a system architecture in another embodiment of a VPN implementation method according to the application and FIG. 4 is a schematic flowchart of another embodiment of a VPN implementation method according to the application. In this embodiment, multiple topologies exist in VPN members of an MPLS VPN.

As shown in FIG. 3, a PE 1 connects a VPNA and a VPNB. It should be noted that the VPNA and the VPNB are VPN members on the side of the PE 1. A PE 2 connects a VPNA and a VPNB, where the VPNA and the VPNB that are connected by the PE 2 are VPN members on the side of the PE 2. The VPNA connected to the PE 1 and the VPNA connected to the PE 2 are connected through an MPLS backbone network, and both belong to a same VPN, that is, a VPNA. The VPNA herein is one VPN. That is, as described above, those connected by the PE 1 and the PE 2, for example, the VPNAs, refer to VPN members, and the VPNA constituted by combining VPNs connected to the PE 1 and the PE 2 refers to one VPN. The VPNB connected to the PE 1 and the VPNB connected to the PE 2 are connected through an MPLS backbone network, and both belong to a same VPN, that is, a VPNB. Each VPN member is connected to one CE device. For example, the VPNA on the side of the PE 1 is connected to a CE 1. Three topologies, that is, a topology 1 (VPN Topo 1), a topology 2 (VPN Topo 2), and a topology 3 (VPN Topo 3), exist in the VPNA connected to the PE 1; and three topologies, that is, a topology 1, a topology 3, and a topology 5 (VPN Topo 5), exist in the VPNA connected on the side of the PE 2. Likewise, for topologies existing in the VPNB members, refer to FIG. 3.

In the system architecture shown in FIG. 3, for the VPN implementation method according to this embodiment, refer to FIG. 4. In the following description, a side on which the PE 1 is located is referred to as a local end, and a side on which a PE 2 is located is referred to as a peer end. The method includes the following steps:

401. During a BGP session setup phase, the PE 1 and the PE 2 determine, by using a BGP Open (Border Gateway Protocol Open) message, that both parties support a VPN topology discovery capability.

After a connection is established between the PE 1 and the PE 2 in the MPLS backbone network, a BGP session setup process between the PE 1 and the PE 2 is performed. In the Border Gateway Protocol (Border Gateway Protocol, BGP for short) session setup phase, the PE 1 and the PE 2 confirms, by sending the BGP Open message, a parameter related to session setup.

In this embodiment, an identifier used for indicating that a PE device supports a VPN topology discovery capability is defined. For example, an identifier "240" is used to indicate the VPN topology discovery capability. Moreover, the identifier is carried in a field corresponding to a capability negotiation parameter in the BGP Open message (the field originally exists in the BGP Open message; and in this embodiment, a new identifier is merely defined to indicate this new capability, that is, the VPN topology discovery capability, and the identifier is set in the field). If the PE 1 supports the VPN topology discovery capability, the PE 1 sends a BGP Open message to the PE 2 at the peer end, where the message carries the identifier "240". When receiving the BGP Open message, the PE 2 may determine, according to the carried identifier "240", that the PE 1 supports the VPN topology discovery capability. Likewise, the PE 1 may also determine, according to an identifier carried in a BGP Open message sent by the PE 2, that the PE 2 supports the VPN topology discovery capability.

The VPN topology discovery capability refers to a capability that a PE device can acquire topology information of VPN members connected to the PE device. When the PE 1 and the PE 2 both determine that the two parties both support the VPN topology discovery capability, 402 is performed; otherwise, if one party thereof does not support the VPN topology discovery capability, a VPN in the multi-topology environment still cannot be implemented, and the process ends.

402. The PE 1 collects information of a VPN topology that can be supported by the local end, that is, by the PE 1, and sends the collected information to the PE 2, and the PE 2 collects information of a VPN topology that can be supported by a local end of the PE 2, that is, by the PE 2, and sends the collected information to the PE 1.

The PE 1 and the PE 2 each collect VPN topology information of the local end of each of the PE 1 and the PE 2, where a used manner may be that a CE reports information of topologies supported by connected VPN members to the PE. For example, referring to FIG. 3, the CE 1 may send, to the PE 1, information of topologies (a topology 1, a topology 2, and a topology 3 are supported) supported by a VPNA that is connected to the CE 1; and likewise, a CE 3 may send, to the PE 2, information of topologies (a topology 1, a topology 3, and a topology 5 are supported) supported by a VPNA that is connected to the CE 3.

In this embodiment, the VPN topology information of the local ends collected by the PE 1 and the PE 2 refers to information of topologies supported by all VPN members that are connected to the local ends. For example, VPN members connected to the PE 1 include the VPNA connected to the CE 1 and a VPNB connected to a CE 2, the information of the topologies supported by the VPNA is the topology 1, the topology 2, and the topology 3, and information of topologies supported by the VPNB is a topology 2, a topology 4, and a topology 6; then, the topology information of the local end obtained by the PE 1 is the topology 1, the topology 2, the topology 3, the topology 4, and the topology 6, and includes the information of the topologies supported by all the VPN members. Likewise, the VPN topology information of the local end obtained by the PE 2 is the topology 1, the topology 3, and the topology 5.

The PE 1 and the PE 2 each encapsulate VPN topology information of the end of each of the PE 1 and the PE 2 in BGP network layer reachability information (Network Layer Reachability Information, NLRI for short), and send it to the peer end. In this embodiment, a packet frame format in which a PE device notifies a peer end of VPN topology information is defined. Referring to Table 1, Table 1 may be referred to as a frame in a VPN topology discovery route.

TABLE 1

| BGP NLRI packet frame for encapsulating VPN topology information |
|---|
| Origin AS (4 octets) |
| VPN MT ID 1 (2 octets) |
| VPN MT ID 2 (2 octets) |
| . . . |
| VPN MT ID N (2 octets) |

As shown in Table 1, MT (Multi-Topology) indicates multiple topologies; and ID is a topology identifier, such as the topology 1 and the topology 2 in the following, where "1" and "2" are equivalent to topology IDs, and the IDs indicate corresponding topologies. Another identifier may also be used in specific implementation. For example, a VPN MT ID 1 represents the topology 1 of the multiple topologies. In addition, in this embodiment, it is designed that each piece of topology information (for example, the VPN MT ID 1) occupies two octets (2 octets). It may also be seen from Table 1 that, the PE device may send, by using the BGP NLRI packet frame shown in Table 1, all VPN topology information corresponding to the PE device to the peer end, for example, "VPN MT ID 1, VPN MT ID 2, . . . , VPN MT ID N".

Optionally, referring to Table 1, in this embodiment, information of an autonomous system (Autonomous System, AS for short) in which the PE device at the local end is located, that is, "Origin AS" shown in Table 1, may also be added to Table 1. This information may occupy four octets (4 octets). By adding the information of the AS in which the PE device is located, the peer end may be enabled to identify an intra-AS or inter-AS scenario, so as to perform different route information processing according to the scenario. For example, the PE device at the peer end can determine, according to an AS in a received packet frame shown in Table 1, whether the VPN is intra-AS or inter-AS, that is, whether a VPN member at the local end and a VPN member at the peer end that are connected by an MPLS backbone network belong to a same AS (that is, intra-AS) or belong to different as (that is, inter-AS). After the scenario is identified, the PE device processes route information according to different scenarios. For example, in a case of an inter-AS scenario, the PE device performs conversion in the inter-AS scenario on received route information, where a common technology is used for specific route information processing, and is no longer described.

403. The PE 1 and the PE 2 each obtain, according to the information of the VPN topologies supported by the local end and the peer end, a topology corresponding to information of a VPN topology jointly supported by the local end and the peer end, as a jointly supported topology.

As described above, the information of the VPN topology supported by the PE 1 includes the topology 1, the topology 2, the topology 3, the topology 4, and the topology 6, and the information of the VPN topology supported by the PE 2 includes the topology 1, the topology 3, and the topology 5. The PE 1 and the PE 2 may each obtain, according to the information of the VPN topologies supported by the two ends, that information of a VPN topology jointly supported by the two parties is the topology 1 and the topology 3, and the topology 1 and the topology 3 are same topologies selected by the two parties. That is, the VPN member connected to the PE 1 and the VPN member connected to the PE 2 may be connected by using the topology 1 and the topology 3.

For example, as shown in FIG. 3, the VPNA connected to the CE 1 and the VPNA connected to the CE 3 may both select their respective topology 1 for connection, or both select their respective topology 3 for connection. For the VPNBs, because the VPNB connected to the CE 2 does not have the topology 1 or the topology 3 jointly supported by the two ends; then, actually, the VPNB and the VPNB that is connected to the CE 4 have no jointly supported topology. Therefore, the two VPNB members, that is, the VPNB connected to the CE 2 and the VPNB connected to the CE 4, at the two ends of the MPLS backbone network, cannot be connected in a same VPN through the MPLS backbone network.

404. The PE 1 and the PE 2 each send, to the peer end, the information of the VPN topology jointly supported by the two ends, and VPN route information corresponding to the information of the VPN topology.

In order to ensure connectivity of VPNs, PE devices need to exchange route information. In this embodiment, after the information of the VPN topology jointly supported by the local end and the peer end is determined, the PE device sends the information of the VPN topology jointly supported by the two ends to the PE device at the peer end. For example, the information of the jointly supported VPN topology may be carried when the VPN route information is sent to the PE device at the peer end.

For example, the VPNA connected to the PE 1 and the VPNA connected to the PE 2 are connected through the MPLS backbone network, and topologies jointly supported by the VPNAs at the two ends are the topology 1 and the topology 3; then, when the PE 1 sends VPN route information of the local end to the PE 2, an identifier of a topology to which the route information belongs is carried. For example, in this embodiment, when the PE 1 sends, by using a VPNv 4 (Virtual Private Network Version 4, virtual private network version 4) packet, route information corresponding to the topology 1, an identifier of the topology 1 is carried, so that the PE 2 at the peer end learns, according to the identifier of the topology 1, that the route information belongs to the topology 1. Likewise, when the PE 2 notifies the PE 1 of route information, an identifier of a topology corresponding to the route information is also carried.

In this embodiment, a new BGP extended community attribute is defined. An identifier of a topology corresponding to the VPN route information is encapsulated in the BGP extended community attribute. The BGP extended community attribute is sent together with route information in a VPNv4 packet (the BGP extended community attribute and the route information are both carried in the VPNv4 packet), so that the peer end may learn a correspondence between route information and a topology. Referring to the following Table 2, Table 2 shows an example of a BGP extended community attribute.

TABLE 2

| BGP extended community attribute for encapsulating VPN topology information | | |
| --- | --- | --- |
| 0x03 (1 octet) | TBD (1 octet) | VPN MT ID (2 octets) |
| Reserved (4 octets) | | |

In the foregoing Table 2 0x03 indicates that the encapsulation table represents an extended community attribute, TBD indicates undefined, Reserved represents a reserved bit, and VPN MT ID is an identifier of a topology to which route information belongs.

According to the foregoing steps, the CE 1 sends route information of the VPNA and a corresponding topology to the PE 1; then, the PE 1 sends them to the PE 2 through the MPLS backbone network; next, the PE 2 forwards them to the CE 3. Likewise, the CE 3 also notifies the CE 1 of route information of the VPNA at the side of the CE 3 and a corresponding topology through a reverse path. Exchange of the foregoing route information enables forwarding devices, for example, a PE device and a CE device, of two VPNA members connected at two ends of the MPLS backbone network, to learn topology information in the VPNAs and perform packet forwarding according to the topology information in a subsequent packet forwarding process, so as to implement VPN connection.

In addition, if different VPNs have a jointly supported topology, the VPNs may be distinguished by using a route target (Route Target, RT for short) when route information is sent. For example, an export RT (export RT) is carried when the route information corresponding to the topology 1 is sent by the local end, and it is assumed that there are two VPN members at the peer end that belong to different VPNs and both have the topology 1. In this case, the PE device at the peer end searches, according to the export RT, for an import RT (import RT) matching the export RT. The two VPNs at the peer end have different import RTs, where only one matches the export RT at the local end. Only two VPN members corresponding to the matched export RT and import RT belong to a same VPN. According to this, the PE device at the peer end can send the route information to a VPN member that belongs to the same VPN.

Embodiment 3

Figure 5:
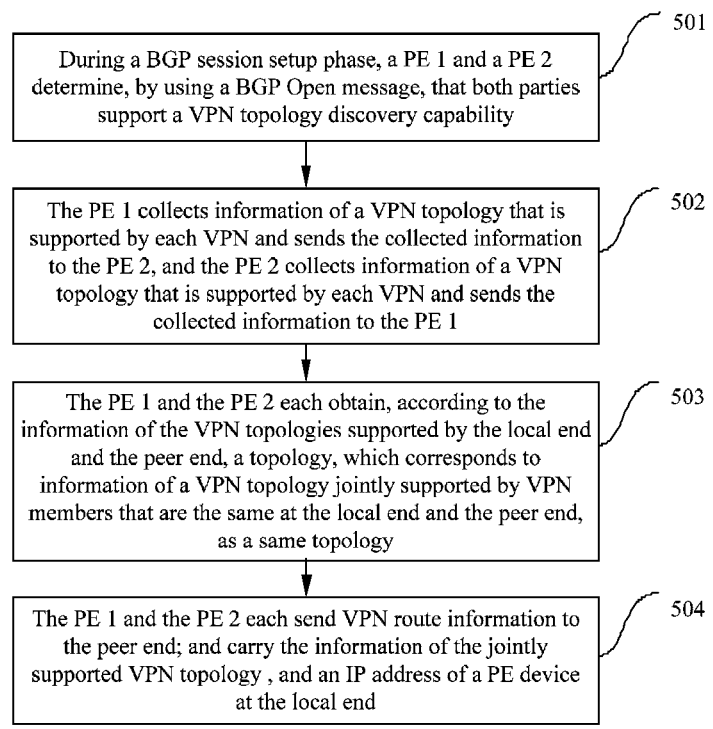
FIG. 5 is a schematic flowchart of still another embodiment of a VPN implementation method according to the application.

FIG. 5 is a schematic flowchart of still another embodiment of a VPN implementation method according to the application. This embodiment is still for a scenario in which multiple topologies exist in VPN members. A difference from Embodiment 2 lies in that, to enable a receiving end to clearly identify a VPN corresponding to VPN topology information, when a PE device in this embodiment sends VPN topology information to a peer end, an identifier of a VPN corresponding to the VPN topology information is carried.

In the following description of the method, processing that is the same as that in Embodiment 2 is described briefly, and a difference from Embodiment 2 is described in detail. As shown in FIG. 5, the method may include the following steps:

501. During a BGP session setup phase, a PE 1 and a PE 2 determine, by using a BGP Open message, that both parties support a VPN topology discovery capability.

502. The PE 1 collects information of a VPN topology that is supported by each VPN on the side of the PE 1 and sends the collected information to the PE 2, and the PE 2 collects information of a VPN topology that is supported by each VPN on the side of the PE 2 and sends the collected information to the PE 1.

In this embodiment, a granularity for collecting VPN topology information is each VPN connected to a PE device. For example, in Embodiment 2, the PE 1 collects topology information of all connected VPN members to obtain that the PE 1 supports the topology 1, the topology 2, the topology 3, the topology 4, and the topology 6; however, it is not distinguished which VPN member each topology belongs to. In this embodiment, the PE 1 distinguishes, when collecting the VPN topology information, VPN members to which topologies belong. For example, a topology 1 belongs to a VPNA, and a topology 4 belongs to a VPNB.

Correspondingly, when a PE device encapsulates VPN topology information of an end of the PE device in BGP NLRI, and sends it to the peer end, an identifier of a VPN corresponding to the VPN topology information is carried. Referring to the following Table 3, Table 3 shows a packet frame format in which a PE device notifies a peer end of VPN topology information. Table 3 may also be referred to as a frame in a VPN topology discovery route.

TABLE 3

| BGP NLRI packet frame for encapsulating VPN topology information |
| --- |
| MY VPN RD (8 octets) |
| MY PE Address (Variable) |
| VPN MT ID 1 (2 octets) |

TABLE 3-continued

| BGP NLRI packet frame for encapsulating VPN topology information |
| --- |
| VPN MT ID 2 (2 octets) |
| . . . |
| VPN MT ID N (2 octets) |

As shown in Table 3, a VPN identifier of a VPN member to which VPN topology information belongs, for example, a route distinguisher (Route Distinguisher, RD for short) of a VPN instance (the VPN instance is a VPN routing and forwarding table, is created and maintained by a PE for a directly connected VPN member, and includes route information related to the VPN member) corresponding to the topology information, and an Internet Protocol (Internet Protocol, IP for short) address of a PE device at the local end where the VPN instance is located are included. In this embodiment, a combination of the RD of the VPN instance and the IP address of the PE in which the VPN instance is located is used to represent a uniquely corresponding VPN member. Table 3 further includes information of a topology supported by the VPN member, and a route target (Route Target, RT for short); and in this case, a carried RT is an export RT (export RT).

Likewise, the PE 2 also sends, to the PE 1 by using a same format as that in Table 3, information of a VPN topology supported by each VPN of the PE 2. In Table 3, "VPN MT ID 1, VPN MT ID 2, . . . , VPN MT ID N" are information of a topology supported by a VPN member corresponding to a combination of "VPN RD and PE Address, that is, an IP address of a PE". For example, a VPNA connected to a CE 1 supports a topology 1, a topology 2, and a topology 3; then, information that is encapsulated by using the format shown in Table 3 and sent by the PE 1 is an RD of the VPNA, an IP address of the PE 1, and topology information (the topology 1, the topology 2, and the topology 3) supported by the VPNA, instead of information of all topologies supported by all VPN members connected to a PE.

503. The PE 1 and the PE 2 each obtain, according to the information of the VPN topologies supported by the local end and the peer end, a topology, which corresponds to information of a VPN topology jointly supported by VPN members that are the same at the local end and the peer end, as a jointly supported topology.

The PE 1 and the PE 2 first obtain, according to the RT sent in 502, VPN topology information, which matches the RT, of the local end. For example, the PE 1 receives a VPN topology discovery route that is in the format shown in Table 3 and sent by the PE 2, and an RT corresponding to the route, where the RT is an export RT; the PE 1 searches for a VPN topology discovery route stored by the PE 1, and if an RT (a corresponding RT in a routing table at the local end is an import RT) of the route matches the export RT, it indicates that the two VPN topology discovery routing tables belong to a same VPN member. For example, a topology discovery route of a VPNA connected to the PE 1 and a corresponding topology discovery route of a VPNA connected to the PE 2 may be found in the foregoing manner.

After it is determined that the VPN topology discovery routes belong to the same VPN member (the same VPN member herein refers to, for example, that two ends are both VPNAs, where an export RT of a VPNA of the PE 1 is equal to an import RT of a VPNA of the PE 2, and an import RT of the VPNA of the PE 1 is equal to an export RT of the VPNA of the PE 2), the PE 1 and the PE 2 search for information of a VPN topology jointly supported by the local end and the peer end for the VPN member. For example, the VPNA connected to the PE 1 supports a topology 1, a topology 2, and a topology 3, and the VPNA connected to the PE 2 supports the topology 1, the topology 3, and a topology 5; then, the topology 1 and the topology 3 are jointly supported by the VPNAs of the PE 1 and the PE 2. Until now, both VPN members that exchange information obtain important 5-tuple information: a local PE address, a local VPN RD, a remote PE address, a remote VPN RD, and information of a jointly supported topology.

504. The PE 1 and the PE 2 each send VPN route information to the peer end; and carry the information of the VPN topology jointly supported by the two ends, and an IP address of a PE device at the local end.

In this embodiment, to enable a receiving end to clearly identify a VPN corresponding to the VPN topology information, when the PE device sends the VPN route information to a PE device at the peer end, the IP address of the PE device at the local end is further carried in addition to an identifier of a topology to which the route information belongs. Referring to the following Table 4, Table 4 shows an example of a BGP extended community attribute.

TABLE 4

| BGP extended community attribute for encapsulating VPN topology information | | |
|---|---|---|
| 0x03 (1 octet) | TBD (1 octet) | VPN MT ID (2 octets) |
| | PE Address (4 octets) | |

For example, when the PE 1 sends a VPNv4 packet to the PE 2 to notify the VPN route information, a VPN MT ID and the IP address (that is, the PE Address) of the PE 1 that are encapsulated in a format shown in Table 4 are carried, where the VPN MT ID is the identifier of the topology to which the route information belongs. In addition, when the VPN route information is sent, a VPN RD (the RD is not set in a same BGP extended community attribute with the VPN MT ID and the PE Address, but is a part of VPNv4 route information) is further carried. When obtaining the identifier of the topology corresponding to the route information, the PE 2 at the peer end may further obtain, according to the IP address of the PE 1 and the VPN RD, a VPN member in which the topology is located. In addition, the foregoing three pieces of information, together with the local PE address and the local VPN RD, are matched with the 5-tuple information obtained in 504, so that the PE 2 can accurately learn a local VPN to which the received route information should to be sent.

Information of a VPN member corresponding to a topology identifier is carried, so that a receiving end identifies a VPN corresponding to VPN topology information, and the receiving end can notifies a corresponding VPN of the VPN route information more quickly, thereby improving efficiency in exchanging VPN route information.

Embodiment 4

Figure 6:
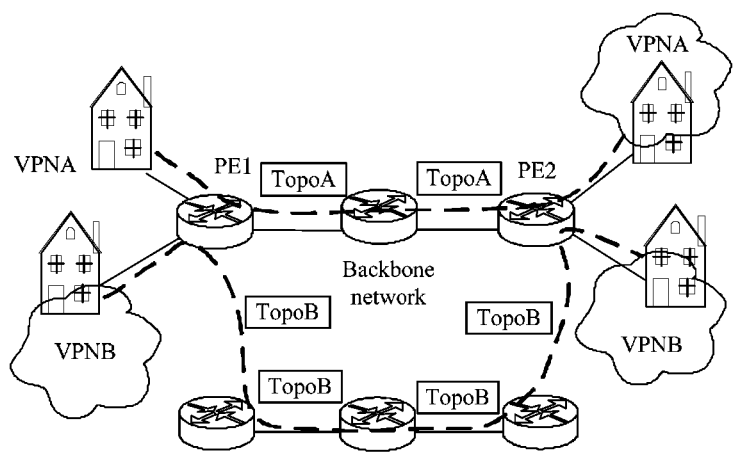
FIG. 6 is a schematic diagram of a system architecture in yet another embodiment of a VPN implementation method according to the application.
Figure 7:
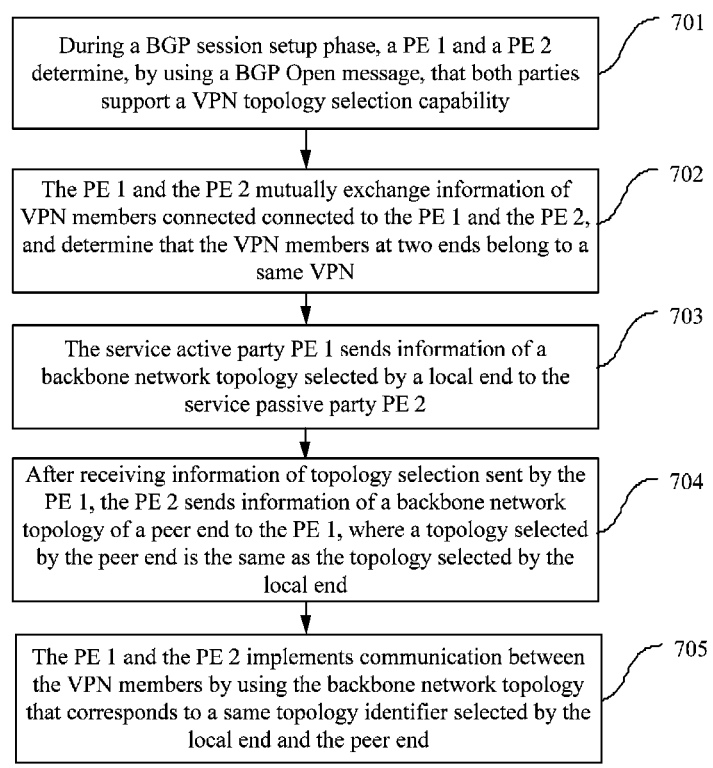
FIG. 7 is a schematic flowchart of yet another embodiment of a VPN implementation method according to the application.

FIG. 6 is a schematic diagram of a system architecture in yet another embodiment of a VPN implementation method according to the application and FIG. 7 is a schematic flowchart of yet another embodiment of a VPN implementation method according to the application. In this embodiment, multiple topologies exist in an MPLS backbone network of an MPLS VPN.

As shown in FIG. 6, a PE 1 connects a VPNA and a VPNB, where the VPNA and the VPNB are VPN members on the side of the PE 1. APE 2 connects a VPNA and a VPNB, where the VPNA and the VPNB are VPN members on the side of the PE 2. The VPNA connected to the PE 1 and the VPNA connected to the PE 2 are connected through an MPLS backbone network, and both belong to a same VPN, that is, a VPNA. The VPNB connected to the PE 1 and the VPNB connected to the PE 2 are connected through an MPLS backbone network, and both belong to a same VPN, that is, a VPNB. Each VPN member is connected to a PE device by using a CE, and the CE is not shown in FIG. 6. In this embodiment, multiple topologies, for example, a topology A (a path represented by a dashed line indicated by Topo A shown in FIG. 6) and a topology B (a path represented by a dashed line indicated by Topo B shown in FIG. 6), exist in the MPLS backbone network.

In the system architecture shown in FIG. 6, for the VPN implementation method according to this embodiment, refer to FIG. 7. How VPN members belonging to a same VPN at two ends of the MPLS backbone network to select a jointly supported topology from the multiple topologies of the MPLS backbone network is described. In a scenario in which the multiple topologies exist in the MPLS backbone network, PE devices at the two ends need to be configured as a service active party or a service passive party in advance. In this embodiment, it is assumed that the PE 1 is a service active party and the PE 2 is a service passive party.

As shown in FIG. 7, the VPN implementation method according to this embodiment includes the following steps:

701. During a BGP session setup phase, a PE 1 and a PE 2 determine, by using a BGP Open message, that both parties support a VPN topology selection capability.

In this embodiment, an identifier used for indicating that a PE device supports a VPN topology selection capability is defined in the BGP Open message. For example, an identifier "120" is used to indicate the VPN topology selection capability. If the PE 1 supports the VPN topology selection capability, the identifier "120" is carried in an BGP Open message sent by the PE 1 to the PE 2 at the peer end. When receiving the BGP Open message, the PE 2 may determine, according to the carried identifier "120", that the PE 1 supports the VPN topology selection capability. Likewise, the PE 1 may also determine, according to an identifier "120" carried in a BGP Open message sent by the PE 2, that the PE 2 supports the VPN topology selection capability.

The VPN topology selection capability refers to a capability that a PE device can select a topology from multiple topologies of an MPLS backbone network, and may specifically be that the PE device performs selection according to a service requirement of a VPN service. When the PE 1 and the PE 2 both determine that the two parties both support the VPN topology selection capability, 702 is performed; otherwise, if one party thereof does not support the VPN topology selection capability, although VPN members at the two ends of the MPLS backbone network may be connected in a same VPN through the MPLS backbone network, it cannot be ensured that the VPN members at the two ends select a jointly supported topology, that is, quality of service of the VPN cannot be ensured.

702. The PE 1 and the PE 2 mutually exchange information of VPN members connected to the PE 1 and the PE 2, and determine that the VPN members at the two ends belong to a same VPN.

In this embodiment, for a same VPN, to enable the VPN members that both belong to the VPN and are at the two ends of the MPLS backbone network to select a jointly supported topology of the MPLS backbone network, first it needs to be determined that subsequent exchange of topology selection information (that is, exchange of information of topologies selected by a service active party and a service passive party) is established between the VPN members of the same VPN.

In this embodiment, information of a VPN member may be notified between PE devices by using an Update (update) message in BGP, and for a frame format of BGP NLRI in the BGP Update message, refer to the following Table 5.

TABLE 5

Frame format for notifying information of a VPN member

MY VPN RD (8 octets)
MY PE Address (Variable)

As shown in Table 5, the notified information of the VPN member includes an IP address (MY PE Address) of a PE device at the local end, and a VPN identifier (MY VPN RD) of a VPN member connected to the local end. In addition, an import RT (where the RT may be borne by using another BGP NLRI) at the local end is further carried.

For example, the PE 1 receives information of a VPNA that is encapsulated by using the BGP NLRI shown in Table 5 and is sent by the PE 2 at the peer end, for example, an RD of the VPNA, an IP address of the PE 2, and an RT; the PE 1 first searches, according to the RT, for information, which is stored by the PE 1, of a VPN member, which matches the RT, at the local end, where the VPN member corresponding to a VPN identifier in the information of the VPN member belongs to a same VPN with a VPN member connected to the PE 2 at the peer end. For example, a VPNA member connected to the PE 1 and a VPNA member connected to the PE 2 are connected in a same VPN (that is, a VPNA) through the MPLS backbone network.

703. The service active party PE 1 sends, to the service passive party PE 2, information of the MPLS backbone network topology selected by a local end, that is, by the PE 1.

The PE 1, as the service active party, first notifies the service passive party PE 2 at the peer end of a topology to which a selected MPLS backbone network tunnel belongs, where the PE 1 may perform selection according to a requirement of a VPN service. Multiple topologies in an MPLS backbone network generally have different QoS, and the PE 1 may select, according to a service requirement, a topology that has corresponding QoS.

Referring to Table 6, Table 6 shows a frame format for notifying a topology selected by a VPN. Information for sending the topology selected by the VPN may be referred to as a VPN topology selection routing message, where the topology selected by the VPN is a topology selected by a PE for the VPN according to VPN information.

TABLE 6

Frame format for notifying a topology selected by a VPN

MY VPN RD (8 octets)
MY PE Address (Variable)
YOUR VPN RD (8 octets)
YOUR PE Address (Variable)
Selected MT ID (2 octets)

Specifically, the PE 1 encapsulates, in BGP NLRI according to the format shown in Table 6, a VPN identifier (MY VPN RD) of a VPN member at the local end, an IP address (MY PE Address) at the local end, a VPN identifier (YOUR VPN RD, where the information is obtained by exchanging the information of the VPN members in 702) of a VPN member at the peer end that belongs to a same VPN as the VPN member at the local end, an IP address (YOUR PE Address, that is, an IP address of the PE 2) of a PE device at the peer end, and a topology identifier (Selected MT ID, for example, a topology A in the MPLS backbone network is selected) of an MPLS backbone network topology selected by the local end, and sends them to the PE 2.

704. After receiving the information, which is sent by the PE 1, of the MPLS backbone network topology selected by the PE 1, the PE 2 sends, to the PE 1, information of an MPLS backbone network topology of the peer end, that is, of the PE 2, where the topology selected by the PE 2 is the same as the topology selected by the PE 1.

In this embodiment, the information of the MPLS backbone network topology selected by the PE 1 is an identifier of the MPLS backbone network topology selected by the PE 1. The PE 2 performs validity verification after receiving the identifier of the MPLS backbone network topology selected by the PE 1, where the verification refers to that the PE 2 checks whether a topology corresponding to the topology identifier is supported on the side of the PE 2; and if the topology can be supported, the PE 2 sends the information of the MPLS backbone network topology (that is, an identifier of the MPLS backbone network topology) selected by the PE 2 to the PE 1, and the MPLS backbone network topology selected by the PE 2 is the same as the MPLS backbone network topology selected by the PE 1.

It may be seen from this embodiment that, for a scenario of selecting a jointly supported topology from multiple topologies of an MPLS backbone network, a PE device as a service active party performs selection first, and notifies a service passive party of selection of the service active party. A PE device as the service passive party may select a topology that is the same as that selected by the service active party, so as to implement same selection between the two ends.

705. The PE 1 and the PE 2 implements communication between the VPN members by using the MPLS backbone network topology that corresponds to a same topology identifier selected by the local end and the peer end.

After the VPN members at the two ends of the MPLS backbone network are connected by the PE 1 and the PE 2 for communication, communication in both directions is performed by using a determined same MPLS backbone network topology. For example, when sending a packet of a VPN member connected to the PE 1 to the PE 2, the PE 1 sends the packet by using the selected MPLS backbone network topology; and when sending a packet of a VPN member of the PE 2 to the PE 1, the PE 2 also sends the packet by using the selected same MPLS backbone network topology. Because the selected MPLS backbone network topologies in both directions are the same and have same QoS, quality of service of a VPN is improved.

Embodiment 5

Figure 8:
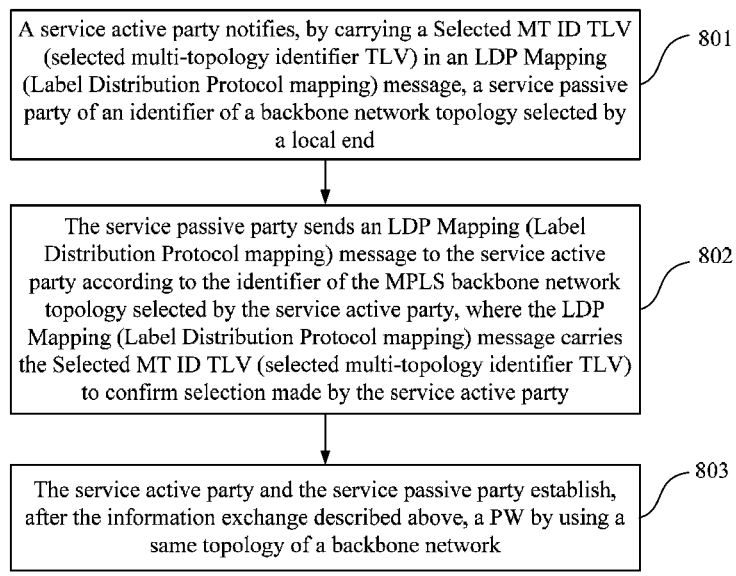
FIG. 8 is a schematic flowchart of yet another embodiment of a VPN implementation method according to the application.

FIG. 8 is a schematic flowchart of yet another embodiment of a VPN implementation method according to the application. This embodiment is described for an implementation manner for selecting a jointly supported topology in a multi-topology MPLS backbone network for a layer-2 service, which is implemented by extending Label Distribution Protocol (Label Distribution Protocol, LDP for short) signaling, so that PE devices at two ends of a pseudo wire (Pseudo Wire, PW for short) of the MPLS backbone network select a tunnel of the jointly supported topology.

In the VPN implementation method according to this embodiment, PE devices in the MPLS backbone network are still configured as a service active party and a service passive party in advance. As shown in FIG. 8, the method may include the following steps:

801. The service active party notifies, by carrying a Selected MT ID TLV (selected multi-topology identifier TLV) in an LDP Mapping (Label Distribution Protocol mapping) message, the service passive party of an identifier of an MPLS backbone network topology selected by a local end.

The LDP Mapping message includes many type/length/values (Type/Length/Value, TLV for short) for different purposes. In this embodiment, the LDP is extended to design a new TLV, that is, the Selected MT ID TLV, which is used to carry a topology ID of an MPLS backbone network selected for the layer-2 service. For a specific format of the Selected MT ID TLV, refer to the following Table 7.

TABLE 7

| Encapsulation format of a Selected MT ID TLV | | | |
|---|---|---|---|
| U-bit = 1 | F-bit = 1 | Selected MT ID (TBA) | Length (2 octets) |
| | Selected MT ID (2 octets) | | Reserved (2 octets) |

In Table 7, the topology identifier, that is, Selected MT ID, of the MPLS backbone network selected for the layer-2 service is carried. The LDP Mapping message further carries an FEC TLV (forwarding equivalence class TLV) and a Generic Label TLV (generic label TLV, which is a distribution label corresponding to the FEC). In this embodiment, the Selected MT ID TLV shown in Table 7 is added to the LDP Mapping message.

802. The service passive party sends an LDP Mapping message to the service active party according to the identifier of the MPLS backbone network topology selected by the service active party, where the LDP Mapping message carries a Selected MT ID TLV to confirm selection made by the service active party.

The service passive party also performs validity verification according to the identifier of the MPLS backbone network topology selected by the service active party, that is, checks whether the service passive party supports the MPLS backbone network topology selected by the service active party. If the service passive party can support the MPLS backbone network topology selected by the service active party, the service passive party sends, to the service active party, the LDP Mapping message, which carries the Selected MT ID TLV. A format of the Selected MT ID TLV is the same as that shown in Table 7, where the identifier, that is, the Selected MT ID, of the MPLS backbone network topology selected by the service active party is encapsulated, which indicates confirmation for the selection made by the service active party, that is, the service passive party also selects the same MPLS backbone network topology.

803. The service active party and the service passive party establish, after the information exchange described above, a PW by using a jointly supported topology of an MPLS backbone network.

The service active party and the service passive party implement communication between VPN members by using the established PW.

Embodiment 6

Figure 9:
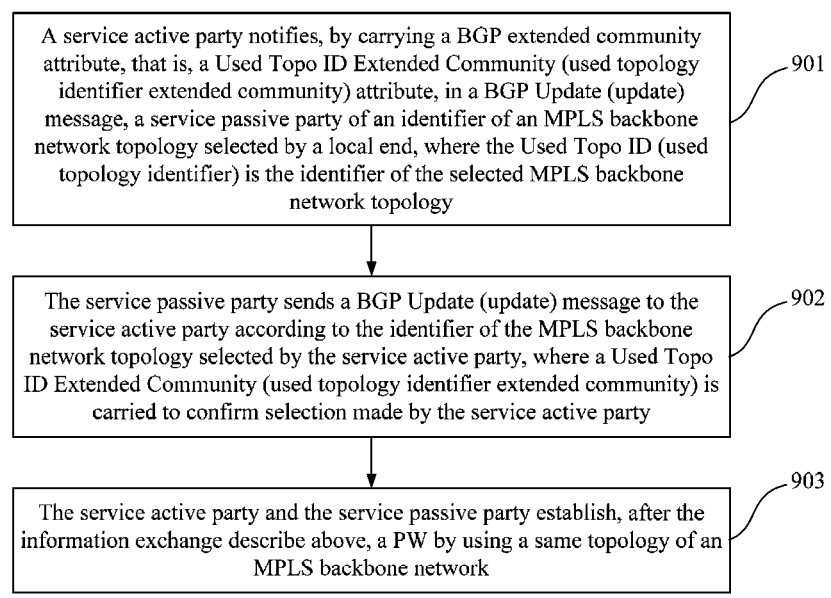
FIG. 9 is a schematic flowchart of yet another embodiment of a VPN implementation method according to the application.

FIG. 9 is a schematic flowchart of yet another embodiment of a VPN implementation method according to the application. This embodiment is also described for an implementation manner for selecting a jointly supported topology in a multi-topology MPLS backbone network for a layer-2 service, which is implemented by extending a BGP protocol, so that PE devices at two ends of a PW of the MPLS backbone network select a tunnel of the jointly supported topology.

In the VPN implementation method according to this embodiment, PE devices in the MPLS backbone network are still configured as a service active party and a service passive party in advance. As shown in FIG. 9, the method may include the following steps:

901. The service active party notifies, by carrying a BGP extended community attribute, that is, a Used Topo ID Extended Community (used topology identifier extended community) attribute, in a BGP Update message, the service passive party of an identifier of an MPLS backbone network topology selected by a local end, where the Used Topo ID is the identifier of the selected MPLS backbone network topology.

A specific format of the BGP extended community attribute is shown in Table 8.

TABLE 8

| BGP extended community attribute for encapsulating MPLS backbone network topology information | | |
|---|---|---|
| 0x03 (1 octet) | TBD (1 octet) | Used Topo ID (2 octets) |
| | Reserved (4 octets) | |

902. The service passive party sends a BGP Update message to the service active party according to the identifier of the MPLS backbone network topology selected by the service active party, where a Used Topo ID Extended Community is carried to confirm selection made by the service active party.

The service passive party also performs validity verification according to the identifier of the MPLS backbone network topology selected by the service active party, that is, checks whether the service passive party supports the MPLS backbone network topology selected by the service active party. If the service passive party can support the MPLS backbone network topology selected by the service active party, the service passive party sends, to the service active party, the BGP Update message, which carries the Used Topo ID Extended Community. A format of the Used Topo ID Extended Community is the same as that shown in Table 8, where the identifier, that is, the Used Topo ID, of the MPLS backbone network topology selected by the service active party is encapsulated, which indicates confirmation for the selection made by the service active party, that is, the service passive party also selects the same MPLS backbone network topology.

903. The service active party and the service passive party establish, after the information exchange described above, a PW by using a jointly supported topology of an MPLS backbone network.

The service active party and the service passive party implement communication between VPN members by using the PW, that is, the jointly supported topology selected by the two ends.

Embodiment 7

Figure 10:
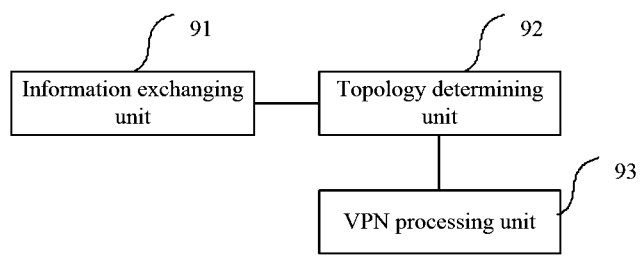
FIG. 10 is a schematic structural diagram of a PE device embodiment according to the application.

FIG. 10 is a schematic structural diagram of a PE device embodiment according to the application. The PE device may execute the VPN implementation method according to any embodiment of the application. For a specific working principle of the PE device, reference may be made to the description of any method embodiment of the application. In this embodiment, only a structure of the PE device is briefly described.

As shown in FIG. 10, the PE device may include an information exchanging unit 91, a topology determining unit 92, and a VPN processing unit 93, where:

the information exchanging unit 91 is configured to send VPN topology information of a local end to a PE device at a peer end, and receive VPN topology information of the peer end sent by the PE device at the peer end;

the topology determining unit 92 is configured to enable, according to the VPN topology information of the local end and the VPN topology information of the peer end, the local end and the peer end to select a jointly supported topology; and the VPN processing unit 93 is configured to connect VPN members by using the jointly supported topology, so as to implement the VPN.

Further, when multiple topologies exist in VPN members of the MPLS VPN, the information exchanging unit 91 is specifically configured to: send, to the PE device at the peer end, information of a topology supported by all VPN members connected to the local end as the VPN topology information of the local end; and receive information of a topology supported by all VPN members connected to the PE device at the peer end sent by the PE device at the peer end; and the VPN processing unit 93 is specifically configured to send VPN route information and information of the jointly supported VPN topology to the PE device at the peer end.

Further, the information exchanging unit 91 is further configured to send, to the PE device at the peer end, a VPN identifier of a VPN member to which the VPN topology information of the local end belongs, an IP address of the local end at which the VPN member is located, and a route target (RT); and receive a VPN identifier of a VPN member to which the VPN topology information belongs, an IP address of the PE device at the peer end, and an RT that are sent by the PE device at the peer end;

the topology determining unit 92 is specifically configured to obtain, according to the received RT sent by the PE device at the peer end, VPN topology information, which matches the RT, of the local end, where a VPN member to which the obtained VPN topology information of the local end belongs is the same as a VPN member at the peer end; and obtain, according to the VPN topology information of the local end and the VPN topology information of the peer end, a topology, which corresponds to information of a VPN topology jointly supported by the VPN members that are the same at the local end and the peer end, as a jointly supported topology; and the VPN processing unit 93 is further configured to send the IP address of the local end to the PE device at the peer end.

Further, the information exchanging unit 91 is specifically configured to encapsulate the VPN topology information of the local end in BGP NLRI, and send it to the PE device at the peer end; and the VPN processing unit 93 is specifically configured to encapsulate, in a BGP extended community attribute, the information of the jointly supported VPN topology, and send it to the PE device at the peer end.

Further, the information exchanging unit 91 is further configured to, before the VPN topology information of the local end is sent to the PE device at the peer end, receive a BGP Open message sent by the PE device at the peer end, where the BGP Open message carries an identifier used for indicating that the PE device at the peer end supports a VPN topology discovery capability.

Further, when multiple topologies exist in an MPLS backbone network of the MPLS VPN, the information exchanging unit 91 is specifically configured to send a topology identifier of an MPLS backbone network topology selected by the local end to the PE device at the peer end, and receive a topology identifier, which is sent by the PE device at the peer end, of an MPLS backbone network topology selected by the peer end;

the topology determining unit 92 is specifically configured to determine, according to the identifier of the MPLS backbone network topology selected by the local end and the topology identifier of the MPLS backbone network topology selected by the peer end, that the local end and the peer end select a same topology identifier; and the VPN processing unit 93 is specifically configured to implement communication between the members by using the MPLS backbone network topology that corresponds to the same topology identifier selected by the local end and the peer end.

Further, the PE device is a service active party of a VPN service; and the information exchanging unit 91 is specifically configured to, after performing the step of sending a topology identifier of an MPLS backbone network topology selected by the local end to the PE device at the peer end, receive the topology identifier, which is sent by the PE device at the peer end, of the MPLS backbone network topology selected by the peer end.

Further, the PE device is a service passive party of a VPN service; and the information exchanging unit 91 is specifically configured to: receive the topology identifier, which is sent by the PE device at the peer end, of the MPLS backbone network topology selected by the peer end; and if the MPLS backbone network topology corresponding to the topology identifier is supported by the local end, send the topology identifier of the MPLS backbone network topology selected by the local end to the PE device at the peer end, where the topology identifier selected by the local end is the same as the topology identifier selected by the peer end.

Further, the information exchanging unit 91 is specifically configured to encapsulate, in BGP NLRI, the topology identifier of the MPLS backbone network topology selected by the local end, and send it to the PE device at the peer end.

Further, the information exchanging unit 91 is further configured to, before encapsulating, in the BGP NLRI, the topology identifier of the MPLS backbone network topology selected by the local end, and sending it to the PE device at the peer end, receive a BGP Open message sent by the PE device at the peer end, where the BGP Open message carries an identifier used for indicating that the PE device at the peer end supports a VPN topology selection capability.

Further, the information exchanging unit 91 is further configured to: before encapsulating, in the BGP NLRI, the topology identifier of the MPLS backbone network topology selected by the local end, and sending it to the PE device at the peer end, encapsulate, in BGP NLRI, an IP address of the local end, VPN identifiers of VPN members connected to the local end, and a route target (RT), and send them to the PE device at the peer end; and receive an IP address of the PE device at the peer end, VPN identifiers of VPN members connected to the PE device at the peer end, and an RT that are sent by the PE device at the peer end by means of BGP NLRI encapsulation;

and configured to encapsulate, in BGP NLRI, the topology identifier of the MPLS backbone network topology selected by the local end, a VPN identifier of a VPN member at the local end that selects the MPLS backbone network topology, the IP address of the local end, a VPN identifier of a VPN member at the peer end that belongs to a same VPN as the VPN member at the local end, and the IP address of the PE device at the peer end, and send them to the PE device at the peer end; and the topology determining unit 92 is further configured to obtain, according to the received RT sent by the PE device at the peer end, a VPN identifier, which matches the RT, of a VPN member at the local end, where the VPN member at the local end and the VPN member at the peer end belong to the same VPN.

Further, the information exchanging unit 91 is specifically configured to encapsulate the topology identifier of the MPLS backbone network topology selected by the local end in an LDP Mapping message, and send it to the PE device at the peer end.

According to the PE device in this embodiment, VPN topology information exchange is performed between a PE device at a local end and a PE device at a peer end, and a jointly supported topology is selected at the local end and the peer end according to the exchanged VPN topology information to implement a VPN, so that a VPN in a multi-topology environment is implemented and quality of service of a multi-topology VPN is improved.

Embodiment 8

Figure 11:
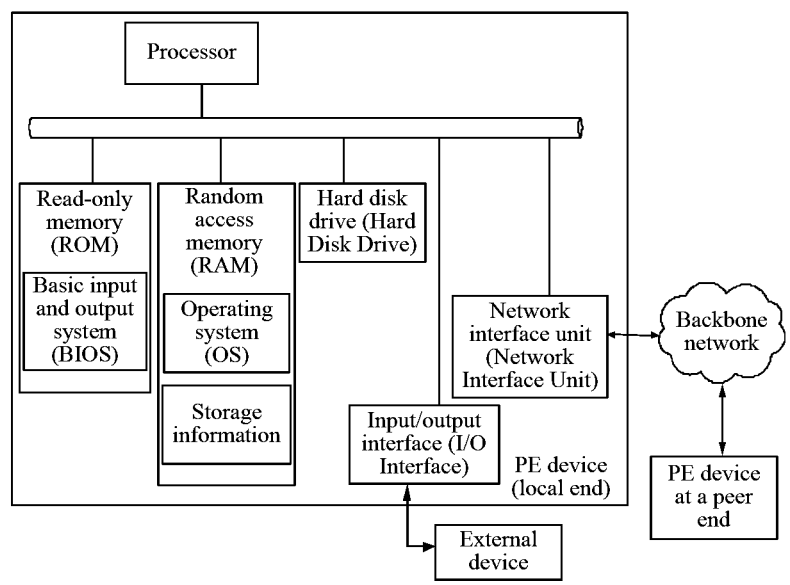
FIG. 11 is an entity structural diagram of a PE device embodiment according to the application.

FIG. 11 is an entity structural diagram of a PE device embodiment according to the application. The PE device includes at least one processor and a memory connected to the at least one processor. The at least one processor reads storage information in the memory to perform a corresponding processing step. For brevity, in FIG. 11, that there is one processor and the memory includes a read-only memory (Read-Only Memory, ROM for short) and a random access memory (random access memory RAM for short) is merely used as an example for description.

The memory is configured to store the storage information, where the storage information includes VPN topology information of a local end and VPN topology information of a peer end.

The processor is configured to send the VPN topology information of the local end to a PE device at the peer end, receive the VPN topology information of the peer end sent by the PE device at the peer end, and send this information to the memory; and is further configured to enable, according to the VPN topology information of the local end and the VPN topology information of the peer end, the local end and the peer end to select a jointly supported topology from the multiple topologies, and connect VPN members by using the jointly supported topology, so as to implement the VPN.

The processor may further be configured to perform steps in the method embodiments, which are not described one by one herein.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the application, but not for limiting the application. Although the application is described in detail with reference to the foregoing embodiments, persons of ordinary skill in the art should understand that they may still make modifications to the technical solutions described in the foregoing embodiments or make equivalent replacements to some or all technical features thereof however, these modifications or replacements do not make the essence of corresponding technical solutions depart from the scope of the technical solutions in the embodiments of the application.

What is claimed is:

1. A virtual private network (VPN) implementation method, applied in a Multiprotocol Label Switching virtual private network (MPLS VPN) comprising an MPLS backbone network in which multiple topologies exist, and VPN members connected through the MPLS backbone network, the MPLS backbone network comprises at least two Provider Edge (PE) devices, and the at least two PE devices are configured to connect the VPN members to the MPLS VPN, wherein multiple traffic transmission paths corresponding to the multiple topologies exist in the MPLS backbone network, the method comprising:

prior to establishing the MPLS VPN, sending, by a PE device at a local end, topology identifiers of MPLS backbone network topologies to a PE device at a peer end, where the topology identifiers are selected by the PE device at a local end;

prior to establishing the MPLS VPN, receiving, by the PE device at a local end, topology identifiers sent by the PE device at the peer end, where the received topology identifiers are of MPLS backbone network topologies selected by the peer end;

enabling, according to the topology identifiers of the MPLS backbone network topologies selected by the PE device at the local end and the topology identifiers of the MPLS backbone network topologies selected by the PE device at the peer end, the local end and the peer end to identify an MPLS backbone network topology from the selected topologies with a same topology identifier; and establishing the MPLS VPN between the VPN members using the MPLS backbone network topology that corresponds to the same topology identifier.

2. The VPN implementation method according to claim 1, wherein the PE device at the local end is a service active party of a VPN service, and wherein sending the topology identifiers of the MPLS backbone network topology selected by the local end to the PE device at the peer end, and receiving the topology identifiers of the MPLS backbone network topologies selected by the peer end further comprises:

after sending the topology identifiers of the MPLS backbone network topologies selected by the local end to the PE device at the peer end, receiving the topology identifiers, which are sent by the PE device at the peer end, of the MPLS backbone network topologies selected by the peer end, wherein the topology identifiers of the MPLS backbone network topologies selected by the peer end are the same as the topology identifiers of the MPLS backbone network topologies selected by the local end.

3. The VPN implementation method according to claim 1, wherein the PE device at the local end is a service passive party of a VPN service; and wherein sending the topology identifiers of the MPLS backbone network topologies selected by the local end to the PE device at the peer end, and receiving the topology identifiers of the MPLS backbone network topologies selected by the peer end comprises:

receiving the topology identifiers, which are sent by the PE device at the peer end, of the MPLS backbone network topologies selected by the peer end; and when the MPLS backbone network topologies corresponding to the topology identifiers, which are sent by the PE device at the peer end, of the MPLS backbone network topologies selected by the peer end are supported by the local end, sending the topology identifiers of the MPLS backbone network topologies selected by the local end to the PE device at the peer end, wherein the topology identifiers selected by the local end are the same as the topology identifiers selected by the peer end.

4. The VPN implementation method according to claim 2, wherein sending the topology identifiers of the MPLS backbone network topologies selected by the local end to the PE device at the peer end comprises:

encapsulating in Border Gateway Protocol network layer reachability information (BGP NLRI), the topology identifiers of the MPLS backbone network topologies selected by the local end, and sending them to the PE device at the peer end.

5. VPN implementation method according to claim 2, wherein sending the topology identifiers of the MPLS backbone network topologies selected by the local end to the PE device at the peer end comprises:

encapsulating the topology identifiers of the MPLS backbone network topologies selected by the local end in a Label Distribution Protocol (LDP) mapping message or a Border Gateway Protocol (BGP) extended community attribute, and sending them to the PE device at the peer end.

6. A Provider Edge (PE) device, applied in a Multiprotocol Label Switching virtual private network (MPLS VPN) comprising a MPLS backbone network in which multiple topologies exist, and VPN members connected through the MPLS backbone network, and at least two PE devices which are the same as the PE device are located in the MPLS backbone network, each of the PE devices is configured to connect the VPN members, wherein multiple traffic transmission paths corresponding to the multiple topologies exist in the MPLS backbone network; and each of the PE devices comprises:

a non-transitory processor readable memory configured to store instructions; and a processor coupled to the memory for executing the instructions stored in the memory, which configures the processor to:

prior to establishing the MPLS VPN, send, by a PE device at a local end, topology identifiers of MPLS backbone network topologies to a PE device at a peer end, where the topology identifiers are selected by the PE device at a local end;

prior to establishing the MPLS VPN, receive, by the PE device at a local end, topology identifiers sent by the PE device at the peer end, where the received topology identifiers are of MPLS backbone network topologies selected by the peer end;

enable, according to the topology identifiers of the MPLS backbone network topologies selected by the PE device at the local end and the topology identifiers of the MPLS backbone network topologies selected by the PE device at the peer end, the local end and the peer end to identify an MPLS backbone network topology from the selected topologies with a same topology identifier; and establish the MPLS VPN between the VPN members using the MPLS backbone network topology that corresponds to the same topology identifier.

7. The PE device according to claim 6, wherein the PE device is a service active party of a VPN service; and the processor is further configured to, after sending the topology identifiers of the MPLS backbone network topologies selected by the local end to the PE device at the peer end, receive the topology identifiers, which are sent by the PE device at the peer end, of the MPLS backbone network topologies selected by the peer end.

8. The PE device according to claim 6, wherein the PE device is a service passive party of a VPN service and the processor is further configured to:

receive the topology identifiers, which are sent by the PE device at the peer end, of the MPLS backbone network topologies selected by the peer end; and when the MPLS backbone network topologies corresponding to the topology identifiers are supported by the local end, send the topology identifiers of the MPLS backbone network topologies selected by the local end to the PE device at the peer end, wherein the topology identifiers selected by the local end are the same as the topology identifiers selected by the peer end.

9. The PE device according to claim 7, wherein the processor is further configured to encapsulate, in Border Gateway Protocol network layer reachability information (BGP NLRI), the topology identifiers of the MPLS backbone network topologies selected by the local end, and send them to the PE device at the peer end.

10. The PE device according to claim 7, wherein the processor is further configured to encapsulate the topology identifiers of the MPLS backbone network topologies selected by the local end in a Label Distribution Protocol (LDP) mapping message or a Border Gateway Protocol (BGP) extended community attribute, and send them to the PE device at the peer end.

* * * * *